(12) United States Patent
Murata et al.

(10) Patent No.: US 8,555,615 B2
(45) Date of Patent: Oct. 15, 2013

(54) INTERNAL COMBUSTION ENGINE EXHAUST GAS CONTROL SYSTEM AND CONTROL METHOD OF INTERNAL COMBUSTION ENGINE EXHAUST GAS CONTROL SYSTEM

(75) Inventors: Hiroki Murata, Gotenba (JP); Isao Matsumoto, Suntou-gun (JP); Naofumi Magarida, Susono (JP); Akira Yamashita, Susono (JP); Hiroyuki Haga, Susono (JP); Takenori Saoda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 12/451,545

(22) PCT Filed: Jun. 5, 2008

(86) PCT No.: PCT/IB2008/001439
§ 371 (c)(1),
(2), (4) Date: Nov. 18, 2009

(87) PCT Pub. No.: WO2008/149209
PCT Pub. Date: Dec. 11, 2008

(65) Prior Publication Data
US 2010/0126142 A1  May 27, 2010

(30) Foreign Application Priority Data
Jun. 6, 2007  (JP) .................................. 2007-150725

(51) Int. Cl.
*F01N 3/00*  (2006.01)
(52) U.S. Cl.
USPC .................... 60/284; 60/278; 60/285; 60/299

(58) Field of Classification Search
USPC ............................................................ 60/284
See application file for complete search history.

(56) References Cited

U.S. PATENT DOCUMENTS 6,321,530 B1   11/2001 Hoshi et al.
6,381,952 B1 * 5/2002 Asanuma et al. ............... 60/284
(Continued)

FOREIGN PATENT DOCUMENTS

EP   1 219 808 A2   7/2002
EP   1 288 473 A2   3/2003
(Continued)

OTHER PUBLICATIONS

International Search Report for International Application No. PCT/IB2008/001439, issued Oct. 27, 2008.

(Continued)

*Primary Examiner* — Thomas Denion
*Assistant Examiner* — Jason Shanske
(74) *Attorney, Agent, or Firm* — Oliff & Berridge, PLC

(57) ABSTRACT

In a control method of an internal combustion engine exhaust gas control system which is applied to a hybrid vehicle that is powered by an internal combustion engine and an electric motor, an exhaust throttle valve, provided downstream of an exhaust gas control catalyst, is controlled to reduce its opening amount to a target opening amount when it is determined that warm-up control of the internal combustion engine needs to be executed. Next, a target injection quantity of fuel necessary to increase the temperature of exhaust gas flowing into the internal combustion engine to a target exhaust gas temperature is calculated. Then, assist torque from the electric motor is adjusted so that the sum of torque from the internal combustion engine when the fuel injection quantity has been set to the target injection quantity and the assist torque substantially equals a required torque.

24 Claims, 6 Drawing Sheets

(56) References Cited

U.S. PATENT DOCUMENTS

| | | | |
|---|---|---|---|
| 6,516,609 B2 * | 2/2003 | Igarashi et al. | 60/284 |
| 6,634,167 B1 * | 10/2003 | Toshioka et al. | 60/284 |
| 6,672,050 B2 * | 1/2004 | Murata et al. | 60/284 |
| 2002/0175212 A1 * | 11/2002 | Hepburn et al. | 236/15 BD |
| 2003/0014966 A1 * | 1/2003 | Hirota et al. | 60/284 |
| 2005/0103002 A1 * | 5/2005 | Kondou et al. | 60/311 |
| 2007/0023005 A1 | 2/2007 | Chmela | |
| 2007/0289287 A1 * | 12/2007 | Tahara et al. | 60/277 |

FOREIGN PATENT DOCUMENTS

| | | |
|---|---|---|
| EP | 1662123 A2 * | 5/2006 |
| JP | U-6-4344 | 1/1994 |
| JP | A-2000-297669 | 10/2000 |
| JP | A-2002-29292 | 1/2002 |
| JP | A-2002-180885 | 6/2002 |
| JP | A-2004-245135 | 9/2004 |
| JP | A-2005-30407 | 2/2005 |
| JP | A-2008-8206 | 1/2008 |
| WO | WO 2005/033496 A1 | 4/2005 |

OTHER PUBLICATIONS

Written Opinion of the International Searching Authority for International Application No. PCT/IB2008/001439, issued Oct. 27, 2008.

English-language Translation of Japanese Office Action for Application No. 2007-150725, issued Dec. 19, 2008.

International Preliminary Report on Patentability for International Application No. PCT/IB2008/001439, issued Aug. 20, 2009.

* cited by examiner

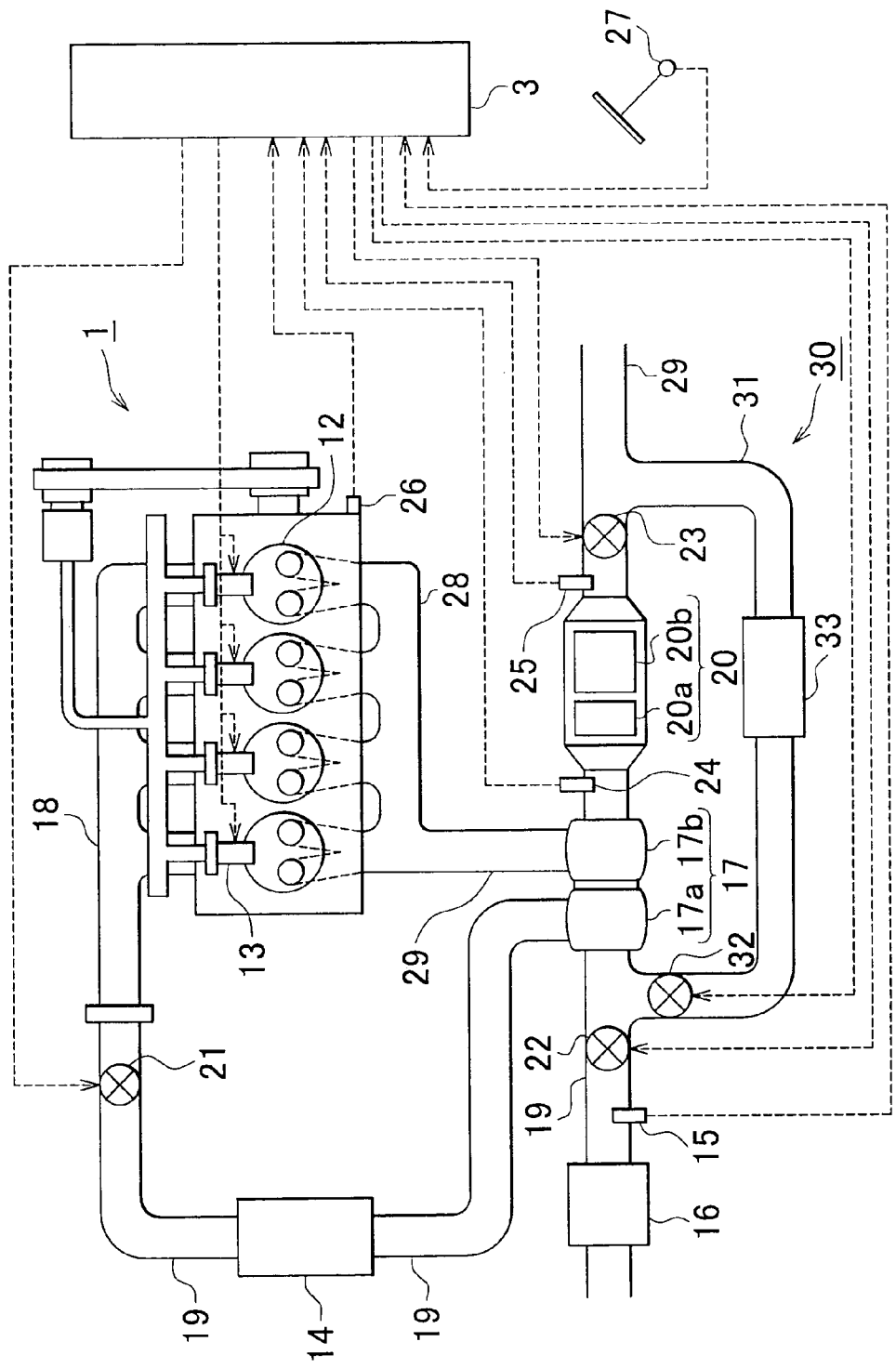

INTERNAL COMBUSTION ENGINE EXHAUST GAS CONTROL SYSTEM AND CONTROL METHOD OF INTERNAL COMBUSTION ENGINE EXHAUST GAS CONTROL SYSTEM

BACKGROUND OF THE INVENTION

1. Field of the Invention

The invention relates to an internal combustion engine exhaust gas control system applied to a hybrid vehicle that runs using two types of power sources, one being an internal combustion engine and the other being an electric motor. The invention also relates to a method of controlling such an internal combustion engine exhaust gas control system.

2. Description of the Related Art

In an internal combustion engine exhaust gas control system applied to a hybrid vehicle that runs using two types of power sources, one being an internal combustion engine and the other being an electric motor, the exhaust gas purifying effect is reduced if the catalyst temperature of an exhaust gas control catalyst is below the catalyst activation temperature. In particular, during a cold start of the internal combustion engine, the exhaust gas control catalyst must be warmed up so that it may be activated quickly.

Japanese Patent Application Publication No. 2000-297669 (JP-A-2000-297669) describes technology for quickly activating an exhaust gas control catalyst by increasing the engine load to raise the exhaust gas temperature when the exhaust gas control catalyst is not yet activated, in an internal combustion engine exhaust gas control system which is applied to a hybrid vehicle. Technology which controls the engine to output constant torque and applies a load to the engine by controlling a motor/generator (M/G) to generate power is also described.

However, although increasing the output of the internal combustion engine hastens activation of the exhaust gas control catalyst, it may also cause emission of large amounts of pollutants (e.g., unburned fuel) into the atmosphere until the exhaust gas control catalyst becomes activated. Also, the engine is stopped when the battery is fully charged so it is possible that the internal combustion engine may start up when the exhaust gas control catalyst is not activated, such as during sudden acceleration.

SUMMARY OF THE INVENTION

The invention thus provides an internal combustion engine exhaust gas control system that is applied to a hybrid vehicle, which effectively executes a warm-up control of an exhaust gas control catalyst and inhibits exhaust gas emissions from deteriorating while the warm-up control is executed. The invention also provides a method of controlling such an internal combustion engine exhaust gas control system.

A first aspect of the invention relates to an internal combustion engine exhaust gas control system applied to a hybrid vehicle that is powered by an internal combustion engine and an electric motor. The exhaust gas control system includes an exhaust gas control catalyst provided in an exhaust passage of the internal combustion engine; a first catalyst warm-up device that warms up the exhaust gas control catalyst by increasing a fuel injection quantity in the internal combustion engine; and an assist amount adjusting device that adjusts assist torque generated by the electric motor such that the sum of engine torque, after the fuel injection quantity has been increased, and the assist torque is substantially equal to a required torque.

In this structure, if the catalyst temperature of the exhaust gas control catalyst is below the catalyst activation temperature, exhaust gas emissions may deteriorate so warm-up control of the exhaust gas control catalyst is executed. In this first aspect, warm-up control for the exhaust gas control catalyst may be executed when the catalyst temperature of the exhaust gas control catalyst is equal to or below a predetermined warm-up threshold temperature, for example. The warm-up threshold temperature may be a temperature that, for example, equals to the sum of the activation temperature of the exhaust gas control catalyst and a predetermined margin. If the catalyst temperature is equal to or below the warm-up threshold temperature, the exhaust gas control catalyst becomes less effective for removing pollutants from the exhaust gas.

Furthermore, the warm-up control may also be executed when the catalyst temperature is below the catalyst activation temperature, as well as during a cold start of the internal combustion engine. The catalyst temperature may be below the catalyst activation temperature when, for example i) the engine torque is maintained excessively low, such as when operating under a light load near idling or when operating with a low exhaust gas temperature from repeated deceleration, and ii) the hybrid vehicle is running using only assist torque generated by the electric motor.

In the foregoing first aspect, the internal combustion engine exhaust gas control system may also include an exhaust throttle valve, which is provided downstream of the exhaust gas control catalyst, and changes the sectional area of the exhaust passage, and a second catalyst warm-up device that warms up the exhaust gas control catalyst by reducing the opening amount of the exhaust throttle valve.

Accordingly, when the warm-up control is executed, the first catalyst warm-up device increases the fuel injection quantity in the internal combustion engine and the second catalyst warm-up device decreases the opening amount of the exhaust throttle valve. When the fuel injection quantity is increased in this case, the temperature of the exhaust gas discharged from the internal combustion engine rises so the temperature of the exhaust gas that flows into the exhaust gas control catalyst rises (hereinafter the temperature of the exhaust gas that flows into the exhaust gas control catalyst may also be referred to as the "inflow-exhaust gas temperature").

Also, when the exhaust throttle valve is controlled so that its opening amount decreases, the back pressure in the internal combustion engine increases so the internal EGR and load increase. As a result, the fuel injection quantity necessary to output engine torque increases in comparison to when the back pressure is low. Also, the pressure within the exhaust passage upstream of the exhaust throttle valve increases, and the inflow-exhaust gas temperature rises as a result of the increase in temperature of the exhaust gas that is discharged from the internal combustion engine. In this specification, unless otherwise noted, "controlling the exhaust throttle valve so that its opening amount decreases" means that the exhaust throttle valve is controlled to decrease its opening amount relative to its opening amount when the warm-up control is not executed.

In this way, according to the first aspect, the first catalyst warm-up device and the second catalyst warm-up device operate in cooperation with one another to raise the inflow-exhaust gas temperature so that the temperature of the exhaust gas control catalyst may be increased. That is, the amount by which the first catalyst warm-up device increases the fuel injection quantity is reduced by the amount that the inflow-exhaust gas temperature is increased by the second catalyst warm-up device, so the amount of exhaust gas may be reduced. Accordingly, because less fuel is injected, the amount of pollutants that is discharged from the internal combustion engine is reduced when executing warm-up control of the exhaust gas control catalyst.

Also, controlling the exhaust throttle valve to sufficiently decrease its opening amount increases the inflow-exhaust gas temperature so the exhaust gas control catalyst may be kept in a high temperature, increased-pressure atmosphere. Accordingly, the temperature of the exhaust gas control catalyst may be raised early on. Moreover, by keeping the amount of exhaust gas that is discharged low while warm-up control is being executed it is possible to suppress large amounts of exhaust gas, which includes pollutants, from passing through the exhaust gas control catalyst without being purified. As described above, the foregoing first aspect inhibits deterioration of exhaust gas emissions when executing warm-up control of the exhaust gas control catalyst.

Furthermore, the engine torque output from the internal combustion engine fluctuates when the first catalyst warm-up device increases the fuel injection quantity. Therefore, when executing warm-up control, the assist torque is adjusted so that the sum of the assist torque and the engine torque after the fuel injection quantity has been increased is substantially equal to the required torque, which is the torque that the driver requires of the hybrid vehicle. Accordingly, the torque required by the driver may be satisfied while suppressing adverse effects on drivability.

According to the first aspect, the first catalyst warm-up device may increase the fuel injection quantity to increase a temperature of exhaust gas flowing into the exhaust gas control catalyst to a target exhaust gas temperature when the second catalyst warm-up device reduces the opening amount of the exhaust throttle valve to a target opening amount.

Here, the target opening amount may be an empirically determined opening amount that sufficiently reduces the flowrate of exhaust gas flowing through the exhaust gas control catalyst to sufficiently increase the pressure in the exhaust passage upstream of the exhaust throttle valve. Also, the target exhaust gas temperature is the target temperature of the inflow-exhaust gas temperature when warm-up control is executed.

Accordingly, the fuel injection quantity is increased by an amount just sufficient to increase the inflow-exhaust gas temperature when the opening amount of the exhaust throttle valve is reduced to the target opening amount, i.e., the inflow-exhaust gas temperature that has been increased by the second catalyst warm-up device, to the target exhaust gas temperature. In this way, the inflow-exhaust gas temperature is first preferentially raised by the second catalyst warm-up device and then further raised to the target exhaust gas temperature by the first catalyst warm-up device. As a result, the inflow-exhaust gas temperature is better able to reach the target exhaust gas temperature.

Also, the amount by which the second catalyst warm-up device increases the inflow-exhaust gas temperature increases as the target opening decreases. Therefore, the amount by which the fuel injection quantity increases may be reduced as the target opening amount is reduced.

Also, by minimizing the increase amount of the fuel injection quantity, the amount of pollutants (such as unburned fuel) discharged from the internal combustion engine during execution of the warm-up control may be reduced. Therefore, the target opening amount may be substantially zero. In this case, the engine torque decreases as the increase amount of the fuel injection quantity decreases and the back pressure increases, but drivability will not be adversely affected because the assist torque is adjusted by the assist amount adjusting device. As a result, exhaust gas emissions during execution of the warm-up control may be further improved. Further, the increase amount of the fuel injection quantity by the first catalyst warm-up device is reduced so fuel efficiency related to warm-up control may be improved.

The target exhaust gas temperature may also be set higher than an activation temperature of the exhaust gas control catalyst. Accordingly, the temperature of the exhaust gas control catalyst is reliably raised to the activation temperature.

Furthermore, if the target exhaust gas temperature becomes too high, the fuel injection quantity that is increased by the first catalyst warm-up device may become excessive, which may cause exhaust gas emissions during warm-up control to deteriorate. Therefore, the target exhaust gas temperature may be set as a temperature that is equal to or less than a threshold emissions temperature at which the amount of pollutants discharged from the internal combustion engine exceeds a predetermined amount.

The threshold emissions temperature may be determined empirically and set to suppress a deterioration in exhaust gas emissions by suppressing excessive amounts of pollutants from being discharged from the internal combustion engine. For example, the threshold emissions temperature may be set so that the concentration of pollutants in exhaust gas discharged from the internal combustion engine is equal to or less than a threshold value. As a result, an excessive increase in the fuel injection quantity may be suppressed, thereby making it possible to inhibit the discharge of excessive amounts of pollutants from the internal combustion engine when warm-up control is executed.

Furthermore, the internal combustion engine exhaust gas control system may also include a catalyst temperature sensor that detects the temperature of the exhaust gas control catalyst. Also, the target exhaust gas temperature may be set equal to or above the detected exhaust gas control catalyst temperature. For example, the catalyst temperature sensor may detect the catalyst temperature intermittently a plurality of times after execution of the warm-up control has started. As a result, the target exhaust gas temperature may be set to a temperature in accordance with the the detected exhaust gas control catalyst temperature, which gradually increases, so the temperature of the exhaust gas control catalyst may be reliably increased.

Also, if the target exhaust gas temperature is set too high with respect to the detected catalyst temperature, increases in the fuel injection quantity by the first catalyst warm-up device may be excessive, which is undesirable from the viewpoint of exhaust gas emissions. In particular, if the target exhaust gas temperature is set higher than the activation temperature even if the catalyst temperature is still excessively below the activation temperature, such as immediately after warm-up control for the exhaust gas control catalyst has started, the fuel injection quantity may suddenly be increased resulting in excessive amounts of unburned fuel and the like being discharged from the internal combustion engine.

Therefore, the target exhaust gas temperature may be set so that the temperature difference between it and the detected exhaust gas control catalyst temperature does not exceed a maximum temperature difference. The maximum temperature difference may be an empirically determined upper limit value of the temperature difference between the detected exhaust gas control catalyst temperature and an inflow-exhaust gas temperature, at which it can be determined that the exhaust gas emissions will not deteriorate even if the fuel injection quantity increases so that the inflow-exhaust gas temperature becomes higher than the catalyst temperature by this temperature difference.

As a result, the fuel injection quantity is inhibited from being suddenly increased, which suppresses excessive amounts of pollutants from being discharged from the internal combustion engine while warm-up control is being executed. Also, the fuel injection quantity is gradually increased in accordance with the catalyst temperature, which improves fuel efficiency related to warm-up control. In addition, the maximum temperature difference of the invention may be a fixed value or may be changed in accordance with the catalyst temperature.

Further, the internal combustion engine exhaust gas control system may also include an EGR apparatus which i) includes an EGR passage that connects the exhaust passage downstream of the exhaust gas control catalyst with an intake passage of the internal combustion engine, and an EGR valve, which is provided in the EGR passage and changes a sectional area of the EGR passage, and ii) recirculates some of the exhaust gas that has passed through the exhaust gas control catalyst to the internal combustion engine via the EGR passage; and a third catalyst warm-up device that warms up the exhaust gas control catalyst by controlling the EGR valve such that the opening amount of the EGR valve increases.

In this case, when the third catalyst warm-up device controls the EGR valve to increase the EGR valve opening-amount, the amount of EGR gas that is recirculated to the internal combustion engine increases, thus increasing the temperature of the intake air. As a result, the temperature of the exhaust gas that is discharged from the internal combustion engine increases, which enables, the temperature of the exhaust gas control apparatus to be increased more quickly. That is, exhaust gas control catalyst can be warmed up even earlier.

Also, when the foregoing internal combustion engine exhaust gas control system has an intake throttle valve, which is provided in the intake passage of the internal combustion engine and adjusts the intake air amount, the third catalyst warm-up device may also control the intake throttle valve to increase the opening amount when controlling the EGR valve to increase its opening amount. As a result, the back pressure of the internal combustion engine increases, which further increases the pressure within the exhaust passage upstream of the exhaust throttle valve, thereby better enabling the exhaust gas control catalyst to be warmed up early.

Moreover, the EGR passage may connect the exhaust passage downstream of the exhaust throttle valve with the intake passage. In this case, the pressure within the EGR passage does not readily increase when the first catalyst warm-up device controls the exhaust throttle valve so that its opening amount decreases. As a result, the EGR gas amount may be adjusted more precisely during the warm-up control.

A second aspect of the invention relates to a control method of an internal combustion engine exhaust gas control system applied to a hybrid vehicle that is powered by an internal combustion engine and an electric motor. This control method includes calculating a target injection quantity of fuel needed to raise the temperature of exhaust gas flowing into the exhaust gas control catalyst to a target exhaust gas temperature when it is determined that warm-up control of the internal combustion engine is to be executed; setting the fuel injection quantity to the target injection quantity; and adjusting assist torque generated by the electric motor such that the sum of torque generated by the internal combustion engine and the assist torque generated by the electric motor substantially equals a required torque.

A third aspect of the invention relates to a control method of an internal combustion engine exhaust gas control system applied to a hybrid vehicle that is powered by an internal combustion engine and an electric motor. The control method includes decreasing an opening amount of an exhaust throttle valve, provided downstream of an exhaust gas control catalyst, to a target opening amount if it is determined that warm-up control of the internal combustion engine is to be executed; calculating a target injection quantity of fuel needed to raise the temperature of exhaust gas flowing into the exhaust gas control catalyst to a target exhaust gas temperature when the opening amount of the exhaust throttle valve is decreased to the target opening amount; setting the fuel injection quantity to the target injection quantity; and adjusting assist torque generated by the electric motor so that the sum of torque generated by the internal combustion engine and the assist torque generated by the electric motor substantially equals a required torque.

In this aspect, the internal combustion engine exhaust gas control system may be provided with an EGR apparatus which i) includes an EGR passage that connects an exhaust passage downstream of the exhaust gas control catalyst with an intake passage of the internal combustion engine, and an EGR valve which is provided in the EGR passage and changes a sectional area of the EGR passage, and ii) recirculates some of the exhaust gas that has passed through the exhaust gas control catalyst to the internal combustion engine via the EGR passage. Also, if it is determined that the warm-up control of the internal combustion engine needs to be executed, the opening amount of the exhaust throttle valve may be decreased to the target opening amount and an opening amount of the EGR valve may be to increased to a predetermined opening amount.

Accordingly, it is possible to inhibit exhaust gas emissions from deteriorating when warm-up control of an exhaust gas catalyst is executed in an internal combustion engine exhaust gas control system that is applied to a hybrid vehicle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a schematic view of the structure of the internal combustion engine exhaust gas control system according to the first example embodiment;

DETAILED DESCRIPTION OF THE EMBODIMENTS

Hereinafter, example embodiments for carrying out the invention will be described in more detail with reference to the accompanying drawings. Incidentally, dimensions, materials, shapes, and correlative arrangements and the like of constituent elements described in these example embodiments are not intended to limit the technical scope of the invention unless specifically stated otherwise.

<Hybrid Vehicle System Structure>

Figure 1:
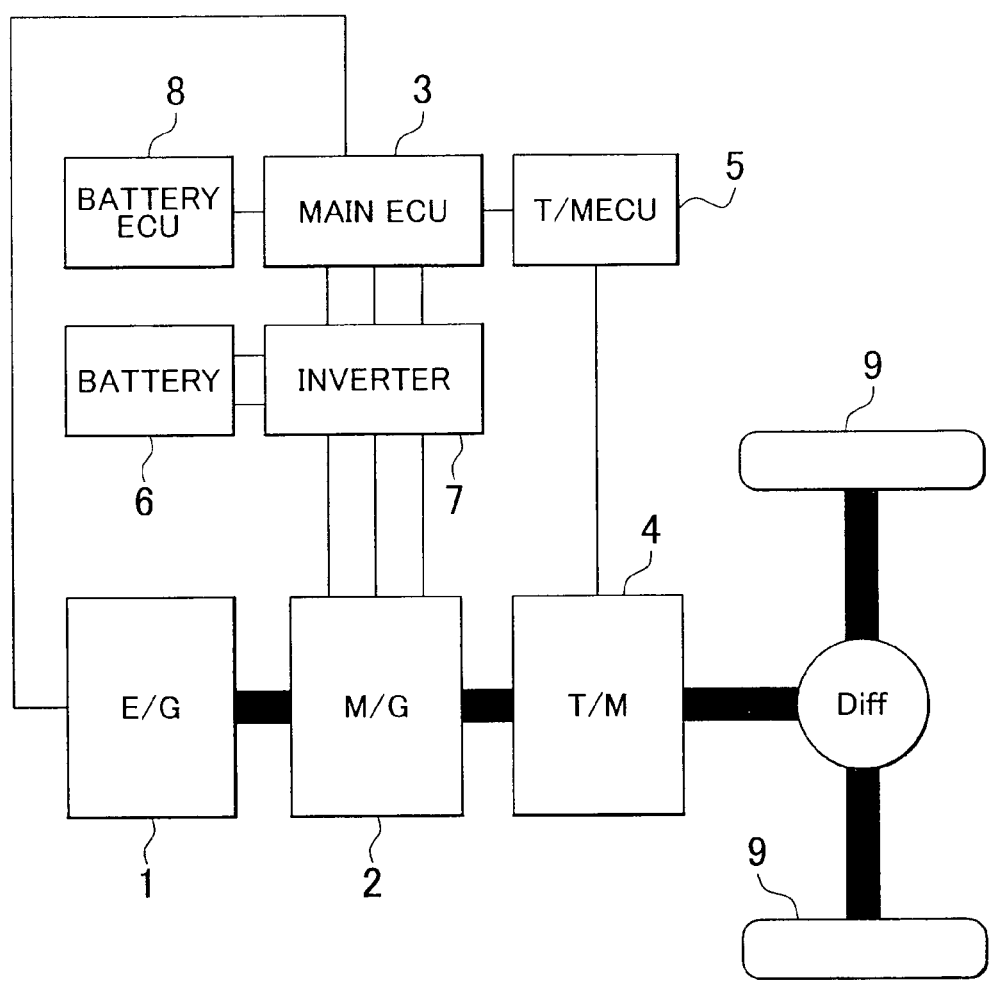
FIG. 1 is a block diagram of a system structure of a hybrid vehicle to which an internal combustion engine exhaust gas control system according to a first example embodiment of the invention is applied.

FIG. 1 is a block diagram of a system structure of a hybrid vehicle to which an internal combustion engine exhaust gas control system according to a first example embodiment of the invention is applied. This system includes an engine 1 that provides the main power for the hybrid vehicle, a motor/generator (hereinafter simply referred to as "MG") 2 that provides assist power, a main ECU 3 that controls the overall system, a transmission (T/M) 4, a transmission (T/M) ECU 5, a battery 6, an inverter 7, and a battery ECU 8.

The MG 2 may function as either an electric motor to provide assist power that is added to the driving force from the engine 1, or a generator to charge the battery 6. In this example embodiment, the MG 2 may be regarded as an electric motor of the invention. The transmission 4 transmits power from the engine 1 to the drive wheels 9 of the hybrid vehicle. The main ECU 3 controls the transmission via the transmission ECU 5.

For example, when the hybrid vehicle is run using only the power from one of the two power sources, i.e., either the engine 1 or the MG 2, the power from the power source that is used is transmitted to the wheels 9 via the transmission 4. If the vehicle is run using power from both of the power sources, power from both the engine 1 and the MG 2 is transmitted to the wheel 9 via the transmission 4.

The battery 6 is a rechargeable secondary battery that serves as a power source to drive the MG 2. The state-of-charge (SOC) of the battery 6 is controlled by the main ECU 3 via the battery ECU 8. The inverter 7 converts direct current (DC) power output from the battery 6 to alternating current (AC) power and supplies it to the MG 2. The inverter 7 is also able to convert AC power generated by the MG 2 into DC power and supply it to the battery 6.

<General Structure of the Exhaust Gas Control System>

FIG. 2 is a schematic view of the structure of the internal combustion engine exhaust gas control system according to the first example embodiment. The engine 1 shown in FIG. 2 is a diesel engine with four cylinders 12. Each cylinder 12 of the engine 1 is provided with a fuel injection valve 13 that injects fuel directly into a combustion chamber of the cylinder 12. In this example embodiment, the engine 1 may be regarded as an internal combustion engine of the invention.

<Intake System>

An intake manifold 18 is connected to the engine 1, with branches of the intake manifold 18 being connected to the combustion chambers of the cylinders 12 via intake ports. A first intake throttle valve 21 is provided near a portion where the intake manifold 18 connects with an intake passage 19. This first intake throttle valve 21 adjusts the flowrate of intake air that flows through the intake passage 19. Also, an intercooler 14 that cools gas flowing through the intake passage 19 is provided in the intake passage 19, upstream of the first intake throttle valve 21.

The compressor housing 17a of a turbocharger 17, which is driven by the energy of flowing exhaust gas, is provided upstream of the intercooler 14. Also, an airflow meter 15 that outputs an electric signal indicating the intake air amount flowing through the intake passage 19 is provided upstream of the compressor housing 17a, and an air cleaner 16 is provided upstream of the airflow meter 16. Also, a second intake throttle valve 22 is provided between the compressor housing 17a and the airflow meter 15. The second intake throttle valve 22 adjusts the flowrate of intake air that flows through the intake passage 19.

In the intake system of the engine 1 having this kind of structure, intake air, from which debris and dust have been removed by the air cleaner 16, flows into the compressor housing 17a through the intake passage 19. The intake air flowing into the compressor housing 17a is compressed by a compressor, not shown, housed within the compressor housing 17a as the compressor rotates. After being compressed, the temperature of the intake air is high so the intake air is then cooled by the intercooler 14 before it flows into the intake manifold 18. The intake air flowing into the intake manifold 18 is distributed via the intake ports, not shown, among the cylinders 12, where it is combusted with the ignition of fuel that is injected from the fuel injection valves 13.

<Exhaust System>

An exhaust manifold 28 is connected to the engine 1, with branches of the intake manifold 28 being connected to the combustion chambers of the cylinders 12 via exhaust ports, not shown. A turbine housing 17b of the turbocharger 17 is connected to the exhaust manifold 28. An exhaust passage 29 is connected to this turbine housing 17b, and is also connected to a muffler, not shown, downstream.

An exhaust gas control apparatus 20 is provided midway in the exhaust passage 29. The exhaust gas control apparatus 20 includes an oxidation catalyst 20a and a particulate filter (hereinafter simply referred to as "filter") 20b downstream of the oxidation catalyst 20a. This filter 20b carries a $NO_x$ storage-reduction catalyst (hereinafter referred to as a "$NO_x$ catalyst").

The oxidation catalyst 20a adsorbs hydrocarbons (HC) in the exhaust gas, and oxidizes the adsorbed HC and the like (i.e., unburned fuel) by catalysis, thereby changing the adsorbed HC to water and carbon dioxide.

Moreover, the filter 20b traps particulate matter (hereinafter simply referred to as "PM") in the exhaust gas. The $NO_x$ catalyst carried on the filter 20b absorbs oxides of nitrogen ($NO_x$) in the exhaust gas when the oxygen concentration in the exhaust gas flowing into the $NO_x$ catalyst is high, and discharges stored $NO_x$ when the oxygen concentration in the exhaust gas flowing into the $NO_x$ catalyst is low. If a reducing component, such as hydrocarbon (HC) or carbon monoxide (CO), is present in the exhaust gas at that time, the $NO_x$ that is discharged from the $NO_x$ catalyst is reduced. In this example embodiment, the exhaust gas control apparatus 20, which includes the oxidation catalyst 20a and the filter 20b, serves as an exhaust gas control catalyst of the invention.

A first temperature sensor 24 that detects the temperature of the exhaust gas flowing into the exhaust gas control apparatus 20 is provided immediately upstream of the exhaust gas control apparatus 20 in the exhaust passage 29, and a second temperature sensor 25 that detects the temperature of the exhaust gas control apparatus 20 from the temperature of exhaust gas flowing out of the exhaust gas control apparatus 20 is provided immediately downstream of the exhaust gas control apparatus 20 in the exhaust gas passage 29. In this example embodiment, the second temperature sensor 25 serves as a catalyst temperature sensor. Also, an exhaust throttle valve 23 that adjusts the flowrate of exhaust gas flowing through the exhaust passage 29 is provided downstream of the second temperature sensor 25 in the exhaust passage 29.

In the exhaust system of the engine 1 having this kind of structure, exhaust gas that was combusted in the cylinders 12 of the engine 1 is discharged into the exhaust manifold 28, and flows into the turbine housing 17b of the turbocharger 17. The energy of the exhaust gas that flows into the turbine housing 17b causes a rotatably supported turbine within the turbine housing 17b, not shown, to rotate. The rotational torque of the turbine, not shown, at this time is transmitted to the compressor, not shown, in the compressor housing 17a.

The exhaust gas that flows out of the turbine housing 17b then flows into the exhaust gas control apparatus 20 where it is purified. After being purified, the exhaust gas passes through the exhaust throttle valve 23, which adjusts the flowrate of the purified exhaust gas as necessary, and is then emitted into the atmosphere through the muffler.

<EGR Apparatus>

The engine 1 is equipped with an EGR apparatus 30 that recirculates some of the exhaust gas that passes through the exhaust passage 29 downstream of the exhaust gas control apparatus 20 to the intake passage 19 upstream of the compressor housing 17a. The EGR apparatus 30 includes an EGR passage 31, an EGR valve 32, and an EGR cooler 33. The EGR passage 31 connects a portion of the exhaust passage 29 downstream of the exhaust throttle valve 23 with a portion of the intake passage 19 that is upstream of the compressor housing 17a, but downstream of the second intake throttle valve 22. The EGR valve 32 adjusts the flowrate of the exhaust gas that flows through the EGR passage 31 (hereinafter this exhaust gas will be referred to as "EGR gas"). The EGR cooler 33 cools the EGR gas that flows upstream of the EGR valve 32 in the EGR passage 31.

When the EGR valve 32 is open, the EGR passage 31 is open such that some of the exhaust gas flowing out from the exhaust gas control apparatus 20 is recirculated into the intake passage 19 via the EGR passage 31. The EGR gas that has flowed into the intake passage 19 is then recirculated to the engine 1 via the compressor housing 17a and the intake manifold 18.

Various sensors related to control of the operating state of the engine are connected via electrical wiring to the main ECU 3 so that the main ECU 3 receives signals output from those sensors. Some of the sensors include the airflow meter 15, the first temperature sensor 24, the second temperature sensor 25, a crankshaft position sensor 26 that detects the engine speed, and an accelerator position sensor 27 that detects the operation amount of an accelerator. A variety of valves, such as the first intake throttle valve 21, the second intake throttle valve 22, the fuel injection valve 13, the exhaust throttle valve 23, and the EGR valve 32, are also connected via electrical wiring to the main ECU 3 and are controlled by the main ECU 3.

Also, the main ECU 3 includes a CPU, ROM, and RAM and the like. Programs for controlling the overall hybrid system related to running the hybrid vehicle, as well as programs for executing a warm-up control of the exhaust gas control apparatus 20, and maps that store data are all stored in the ROM. A control process that will be described later is one such program that is stored in the ROM of the main ECU 3.

Now, a running control of the hybrid vehicle according to the foregoing example embodiment will be described. In the hybrid system of the example embodiment, the running state of the hybrid vehicle is controlled by controlling the distribution of driving force from the engine 1 and the MG 2 by the main ECU 3.

The main ECU 3 controls torque output from the engine 1 (hereinafter simply referred to as "engine torque") TQe and torque output from the MG 2 (hereinafter simply referred to as "assist torque") TQa such that the sum of the engine torque TQe and the assist torque TQa satisfies a required torque TQr.

For example, when the hybrid vehicle is started, the MG 2 is driven using electric energy from the battery 6 and functions as an electric motor. The power that the MG 2 generates is used to crank and start the engine 1. If the hybrid vehicle takes off from a standstill when the SOC of the battery 6 is high, for example, the battery 6 does not need to be charged by the MG 2 so the engine 1 is started only so that it warms up, and the hybrid vehicle takes off using the driving force generated by the MG 2. On the other hand, if the hybrid vehicle takes off from a standstill when the SOC of the battery 6 is low, the MG 2 functions as a generator using power from the engine 1, and the battery 6 is charged.

Here, if the catalyst temperature of the oxidation catalyst 20a is below the activation temperature of the oxidization catalyst 20a, as is generally the case during a cold start of the engine 1, unburned HC discharged from the engine 1 passes through the oxidization catalyst 20a and is emitted into the atmosphere. Therefore, related technology has aimed at warming up the exhaust gas control apparatus 20 quickly by increasing the fuel injection quantity of the engine 1 during a cold start.

However, by increasing the quantity of fuel injected into the engine 1 the amount of unburned HC and the flowrate of the exhaust gas that are discharged from the engine 1 are also increased. As a result, exhaust gas emissions in which large amounts of unburned HC end up being emitted into the atmosphere may deteriorate while the exhaust gas control apparatus 20 is warming up.

Therefore, in this embodiment, the warm-up control for the exhaust gas control apparatus 20 is executed while inhibiting exhaust gas emissions from deteriorating. Next, the warm-up control for the exhaust gas control apparatus 20 of this example embodiment will be described. The warm-up of the oxidation catalyst 20a will be described as an example.

In the warm-up control of this embodiment, the fuel injection quantity Qf is increased when executing exhaust throttle control to reduce the opening amount De of the exhaust throttle valve 23. As a result, the temperature of the exhaust gas flowing into the oxidation catalyst 20a (hereinafter this temperature will simply be referred to as "inflowing exhaust gas temperature") is increased while the flowrate Ve of exhaust gas flowing through the oxidation catalyst 20a (hereinafter this flowrate will simply be referred to as "flow-through exhaust gas flowrate") remains low.

Figure 3A:
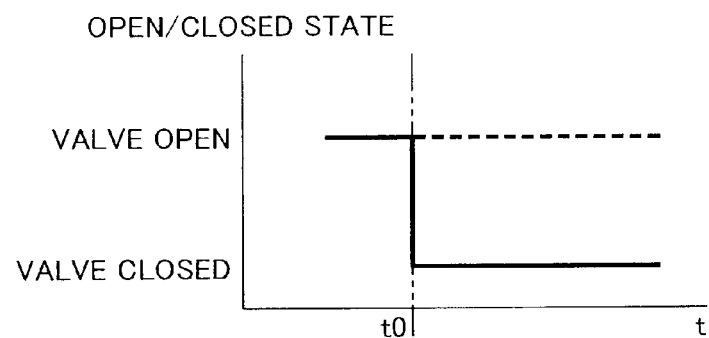
FIG. 3A is a time chart illustrating the open and closed states of an exhaust throttle valve when warm-up control in the first example embodiment is executed.
Figure 3B:
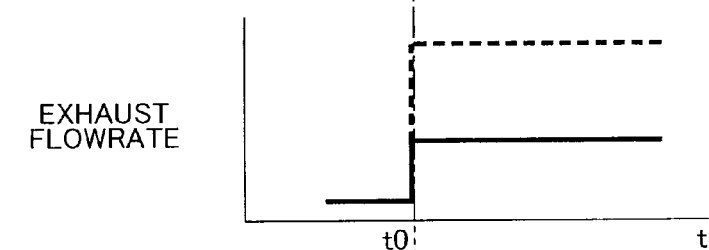
FIG. 3B is a time chart illustrating the exhaust flowrate when the warm-up control in the first example embodiment is executed.
Figure 3C:
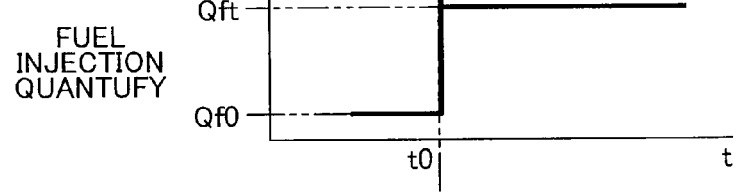
FIG. 3C is a time chart illustrating the fuel injection quantity when the warm-up control in the first example embodiment is executed.

FIG. 3 is a set of time charts showing the open/closed state of the exhaust throttle valve (FIG. 3A), the flow-through exhaust gas flowrate Ve (FIG. 3B), and the fuel injection quantity Qf (FIG. 3C) when the warm-up control is executed.

Reference character "t0" indicated on the horizontal axis refers to the point in time at which a command is output to execute the warm-up control for the oxidation catalyst 20a. The time charts also show a case in which the oxidation catalyst 20a is warmed up via increasing the fuel injection quantity Qf alone, in which case the exhaust throttle control is not executed (when the oxidation catalyst is warmed up via increasing the fuel injection quantity alone, the control will be referred to as "related warm-up.

As shown in FIG. 3A, when a command is output to the execute warm-up control at time t0, the exhaust throttle valve 23 is controlled to decrease its opening amount De. Accordingly, in the example embodiment, the opening amount De of the exhaust throttle valve 23 is changed from fully open to fully closed. When the exhaust throttle valve control is executed, the pressure within the exhaust passage 29 upstream of the exhaust throttle valve 23 increases such that the temperature of the exhaust gas flowing into the oxidation catalyst 20a (i.e., the inflowing exhaust gas temperature) Tgi increases. In addition, by fully closing the exhaust throttle valve 23, it is possible to maintain a low flow-through exhaust gas flowrate Ve, as shown in FIG. 3B.

Because the inflow exhaust gas temperature Tgi rises after the the exhaust throttle control is executed, the fuel injection quantity Qf during execution of warm-up control is smaller in this example embodiment than in a related warm-up control. More specifically, the fuel injection quantity Qf increases from Qf0 to a warm-up control injection quantity Qft (hereinafter referred to as the "target injection quantity") at time t0, as shown in FIG. 3C.

The fuel injection quantity Qf0 is a fuel injection quantity appropriate for the operating state of the engine 1 before the warm-up control is executed, and may be determined empirically. Furthermore, the target injection quantity Qft is the target value for the fuel injection quantity Qf when executing warm-up control. More specifically, the target injection quantity Qft is set such that the inflow-exhaust gas temperature Tgi, when the opening amount De of the exhaust throttle valve 23 is fully closed, increases to a target inflow-exhaust gas temperature Tgit. The target inflow-exhaust gas temperature Tgit is the target temperature for the inflow-exhaust gas temperature Tgi when executing warm-up control. The target inflow-exhaust gas temperature Tgit in the example embodiment may be considered the target exhaust gas temperature of the invention.

As described above, the target injection quantity Qft in this embodiment increases the fuel injection quantity Qf to compensate for the insufficient increase in temperature with respect to the target inflow-exhaust gas temperature Tgit after the inflow-exhaust gas temperature Tgi has been preferentially increased by exhaust throttle control. Here, the target injection quantity Qft may be reduced as the opening amount De of the exhaust throttle valve 23 is becomes smaller. This is because a greater increase in the inflow-exhaust gas temperature Tgi from exhaust throttle control may be expected as the opening amount De of the exhaust throttle valve 23 decreases.

That is, in the warm-up control of this embodiment, fully closing the exhaust throttle valve 23 minimizes the target injection quantity Qft needed to raise the inflow-exhaust gas temperature Tgi to the target inflow-exhaust gas temperature Tgit. Accordingly, the amount of unburned HC discharged from the engine 1 is reduced without impairing early activation of the oxidization catalyst 20a. The term "fully closed" in this example embodiment may be regarded as a predetermined opening amount of the invention.

Next, the setting of the target inflow-exhaust gas temperature Tgit in this embodiment will be described in detail. The target inflow-exhaust gas temperature Tgit in this example embodiment is set higher than the activation temperature Tca of the oxidation catalyst 20a. That is, by setting the target inflow-exhaust gas temperature Tgit higher than the activation temperature Tca, the oxidation catalyst 20a is reliably activated.

However, if the target inflow-exhaust gas temperature Tgit is set too high, the target fuel injection quantity Qft may become excessive, which is undesirable from the viewpoint of suppressing emission of excessive HC during the warm-up control. Therefore, in this embodiment, a threshold emissions temperature Tlm is set as a maximum value of the target inflow-exhaust gas temperature Tgit. That is, the target inflow-exhaust gas temperature Tgit may be set to a temperature higher than the activation temperature Tca of the oxidation catalyst 20a, but no higher than the threshold emissions temperature Tlm.

The threshold emissions temperature Tlm may be determined empirically and set to suppress a deterioration of the exhaust gas emissions by suppressing excessive amounts of unburned HC from being discharged from the engine 1. More specifically, the threshold emissions temperature, Tlm may be set such that the HC concentration in the exhaust gas discharged from the engine 1 is no higher than an allowed value which is set in advance, for example. Accordingly, the exhaust gas emissions will not deteriorate excessively even when the fuel injection quantity Qf is increased to raise the inflow-exhaust gas temperature Tgi to the target inflow-exhaust gas temperature Tgit.

Next, an assist amount adjusting control of this embodiment will be described. As described above, when the warm-up control is executed, the engine torque TQe is increased by increasing the fuel injection quantity Qf to the target injection quantity Qft. Accordingly, when executing the warm-up control, the assist amount adjusting control is also executed to reduce the assist torque TQa output from the MG 2 by the amount that the engine torque is increased (hereinafter this amount will be referred to as the "engine torque increase amount") ΔTQe.

Accordingly, the sum of the engine torque TQe and the assist torque TQa can be made to match the required torque TQr, which suppresses any deterioration in drivability. The main ECU 3 that executes the assist amount adjusting control in this embodiment may be regarded as an assist amount adjusting device of the invention.

Figure 4:
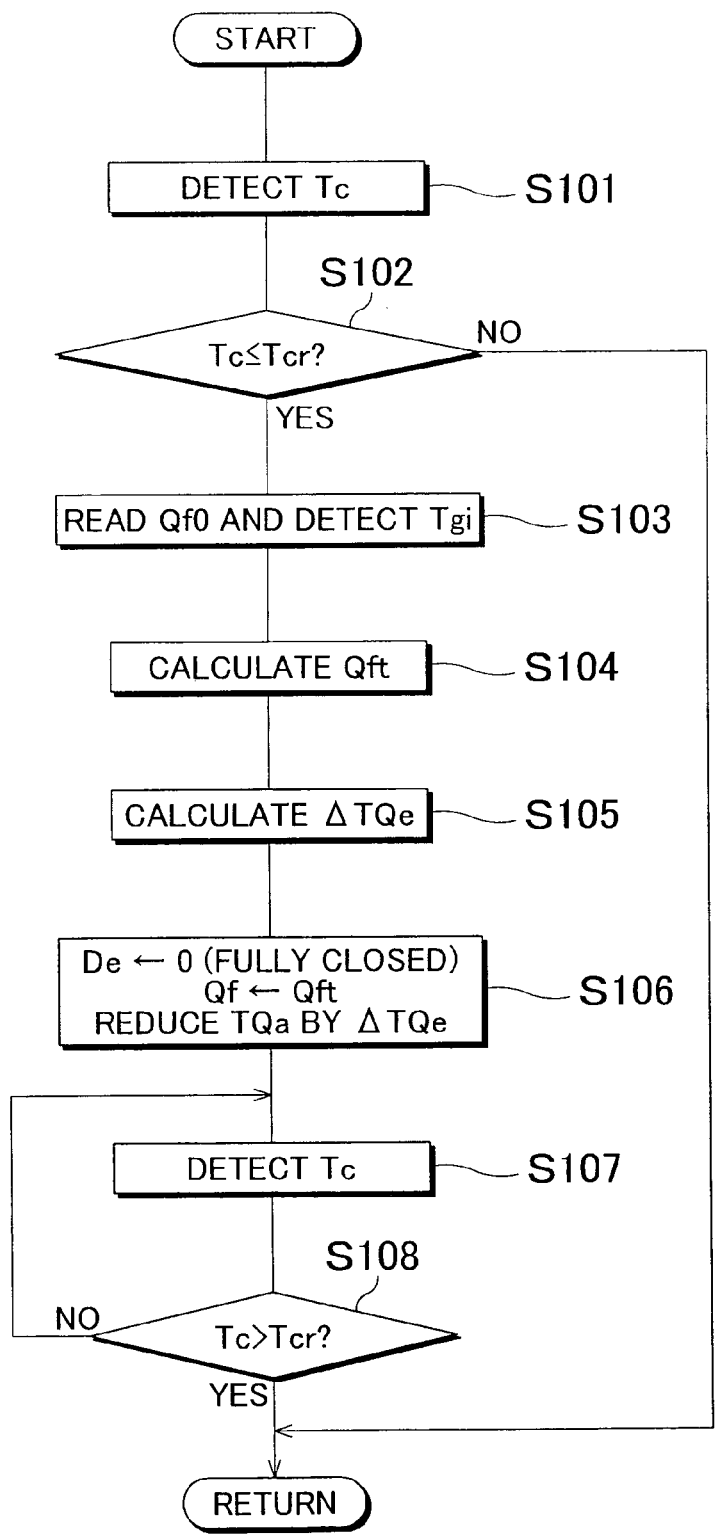
FIG. 4 is a flowchart illustrating a warm-up control process according to the first example embodiment.

Hereinafter, the warm-up control executed by the main ECU 3 will be described with reference to the flowchart in FIG. 4 which illustrates a warm-up control process according to this embodiment. This control process is a program that is stored in the ROM of the main ECU 3 and is executed at predetermined intervals.

When the process is executed, first in step S101, the catalyst temperature Tc of the oxidation catalyst 20a is detected based on the output value of the second temperature sensor 25. Then in step S102 it is determined whether the catalyst temperature Tc is equal to or below a temperature that requires the warm-up control to be executed (hereinafter simply referred to as "warm-up threshold temperature") Tcr. The warm-up threshold temperature Tcr is equal to the sum of the activation temperature Tca of the oxidation catalyst 20a plus a predetermined margin. If the catalyst temperature Tc is equal to or below the warm-up threshold temperature Tcr, it is determined that it is necessary to execute the warm-up control because the exhaust gas purifying performance is significantly low.

If it is determined that the catalyst temperature Tc is equal to or below the warm-up threshold temperature Tcr, it is determined that there is a need to execute warm-up control so the process proceeds on to step S103. If, on the other hand, it is determined that the catalyst temperature Tc is higher than the warm-up threshold temperature Tcr, then it is determined that there is no need to execute warm-up control so this cycle of the process ends.

In step S103, the current fuel injection quantity QM calculated by the main ECU 3 is read and the inflow-exhaust gas temperature Tgi is detected from the output value of the first temperature sensor 24. Next in step S104, the target injection quantity Qft is calculated based on the inflow-exhaust gas temperature Tgi, the target inflow-exhaust gas temperature Tgit, and the fuel injection quantity Qf0.

In step S105, the engine torque increase amount ΔTQe that occurs when the fuel injection quantity Qf is increased from Qf0 to the target injection quantity Qft is calculated. Then in step S106, the opening amount De of the exhaust throttle valve 23 is changed to zero (i.e., fully closed) and the fuel injection quantity Qf is increased to the target injection quantity Qft. Also, a command is output to the MG 2 to reduce the assist torque TQa by an amount equal to the engine torque increase amount ΔTQe. Accordingly, the inflow-exhaust gas temperature Tgi rises to the target inflow-exhaust gas temperature Tgit so the temperature of the oxidation catalyst 20a rises.

In step S107, the catalyst temperature Tc of the oxidation catalyst 20a is again detected based on the output value of the second temperature sensor 25. Next, in step S108, it is determined whether the catalyst temperature Tc exceeds the warm-up threshold temperature Tcr. If it is determined that the catalyst temperature Tc is above the warm-up threshold temperature Tcr, then it is determined that the warm-up control may be ended and this cycle of the process ends.

Also, if it is determined that the catalyst temperature Tc is equal to or below the warm-up threshold temperature Tcr, it is determined that the temperature of the oxidation catalyst 20a needs to be raised again so the process returns to step S107. That is, warm-up control for the oxidation catalyst 20a continues until the catalyst temperature Tc is higher than the warm-up threshold temperature Tcr. In the warm-up control process, the main ECU 3 that executes step S106 functions as the first catalyst warm-up device and the second catalyst warm-up device of the invention.

Furthermore, if the engine torque increase amount ΔTQe is greater than the assist torque TQa, the engine torque TQe may exceed the required torque TQr even if the assist torque TQa is zero. In this case, the MG 2 may be made to function as a generator and absorb the excess torque amount of the engine torque TQe (i.e., the difference of the engine torque increase amount ΔTQe minus the assist torque TQa) through a power generation control.

Also, in step S106, the opening amount De of the exhaust throttle valve 23 is changed to 0 (i.e., fully closed), but the invention is not limited to this. For example, the opening amount De of the exhaust throttle valve 23 may be reduced to an opening amount that sufficiently reduces the flow-through exhaust gas flowrate Ve to sufficiently increase the pressure within the exhaust passage 29 upstream of the exhaust throttle valve 23, and the appropriate opening amount may be determined empirically. Further, the target injection quantity Qft may be set in accordance with the target opening amount when reducing the opening amount of the exhaust throttle valve 23. For example, the target injection quantity Qft may be decreased in conjunction with reductions in the target opening amount decreases. Alternatively, the opening amount of the exhaust throttle valve 23 may be kept the same (i.e., not changed at all).

Figure 5:
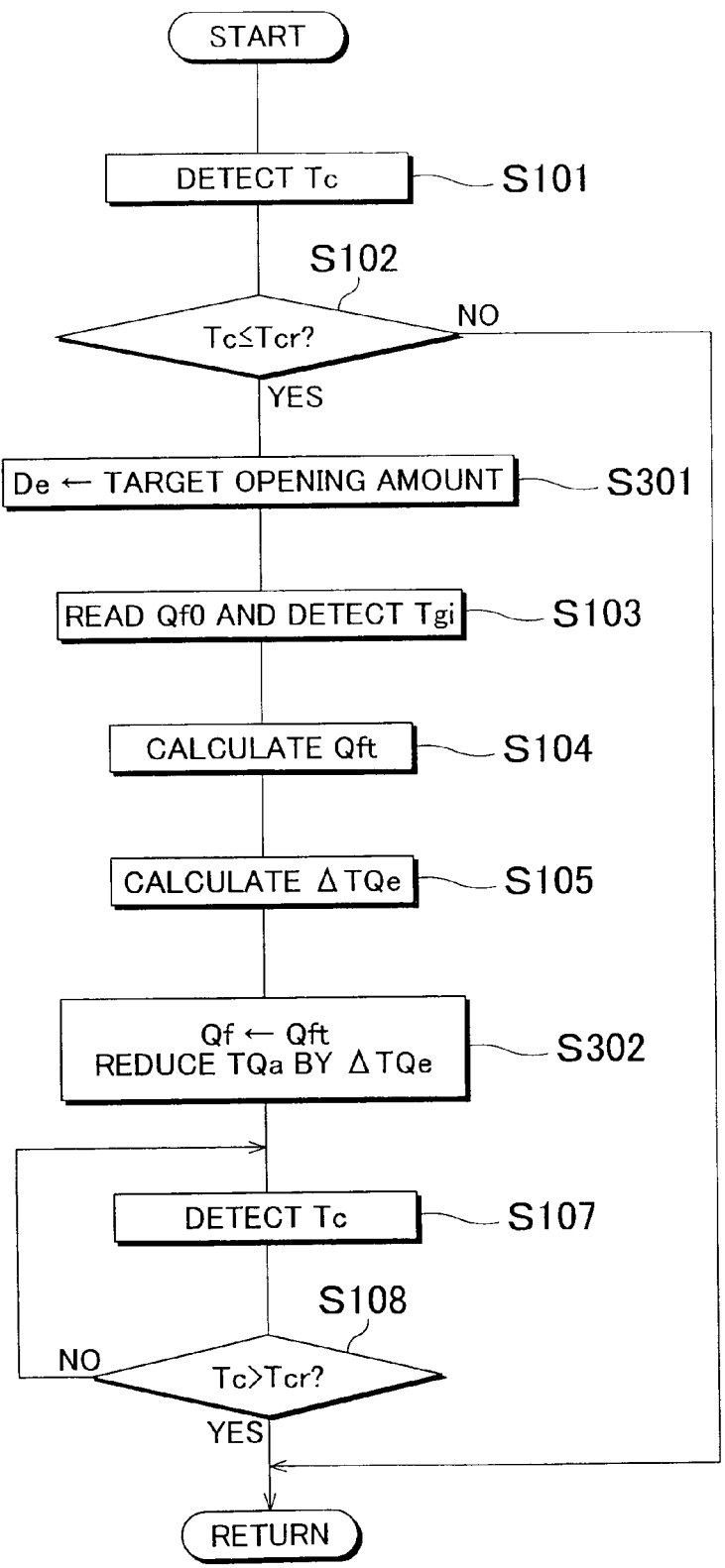
FIG. 5 is a flowchart illustrating a warm-up control process according to a modified example of the first example embodiment.

In this case, a flowchart such as that shown in FIG. 5 may be used. That is, if it is determined that there is a need to execute warm-up control (step S102), the exhaust throttle valve 23 is set to the target opening amount (step S301). The target injection quantity Qft is then calculated based on this target opening amount, the current fuel injection quantity QfD, and the inflow-exhaust gas temperature Tgi (step S104). Then the engine torque increase quantity ΔTQe that occurs when the fuel injection quantity Qf is increased from QfD to the target injection quantity Qft is calculated (step S105), and the fuel injection quantity is increased to the target injection quantity Qft (step S302). Also, the assist torque TQa is reduced by an amount equal to the engine torque increase amount ΔTQe. Thereafter the process is the same as that shown in FIG. 4 so a description thereof will be omitted.

In this embodiment, although the invention is applied to a warm-up control for the oxidation catalyst 20a having the exhaust gas control catalyst 20, the invention may also be applied to warm-up control for the $NO_x$ catalyst carried on the filter 20b, for example.

Next, a second embodiment of the invention, which differs from the first embodiment, will be described. The system structure of the hybrid vehicle and the general structure of the exhaust gas control system in this second embodiment are the same as in the first embodiment so descriptions thereof will be omitted.

Next, the warm-up control of the oxidation catalyst 20a according to the second embodiment will be described. With the warm-up control in the first embodiment, a case is described in which the target inflow-exhaust gas temperature Tgit is set to a higher temperature than the activation temperature Tca of the oxidation catalyst 20a but no higher than the threshold emissions temperature Tim in order to suppress a deterioration of exhaust gas emissions when the warm-up control is executed.

However, if the target inflow-exhaust gas temperature Tgit is set higher than the activation temperature Tca, even though the catalyst temperature Tc is still below the activation temperature Tca immediately after warm-up control has started, for example, the fuel injection quantity Qf may suddenly increase such that large amounts of unburned HC may be discharged from the engine 1. On the other hand, in order to reliably and efficiently increase the temperature of the oxidation catalyst 20a, the inflow-exhaust gas temperature Tgi only needs be raised so that it is at least higher than the current catalyst temperature Tc.

Therefore, in this embodiment, the catalyst temperature Tc during warm-up control is detected and the target inflow-exhaust gas temperature Tgit is set higher than the detected catalyst temperature Tc by a reference temperature difference ΔTb. That is, the target inflow-exhaust gas temperature Tgit is raised incrementally in accordance with the detected catalyst temperature Tc, and along with that increase, the target injection quantity Qft is also increased incrementally.

Also in this embodiment, the reference temperature difference ΔTb is set so as not to exceed a threshold temperature difference ΔTlm. The threshold temperature difference ΔTlm is a maximum temperature difference that may be empirically determined and at which it can be determined that exhaust gas emissions will not deteriorate even if the fuel injection quantity Qf is increased in order to raise the inflow-exhaust gas temperature Tgi so that it is higher than the catalyst temperature Tc by this temperature difference. That is, the threshold temperature difference ΔTlm is a temperature difference in which the amount of increase in pollutants (such as HC) in the exhaust gas is equal to or less than a maximum value. In this embodiment, the threshold temperature difference ΔTlm may be regarded as a maximum temperature difference of the invention. Furthermore, the reference temperature difference ΔTb and the threshold temperature difference ΔTlm may be fixed temperature differences that are set in advance or they may be varied in accordance with the catalyst temperature Tc.

As a result, it is possible to suppress the discharge of excessive amounts of unburned HC from the engine 1 when warm-up control is executed. Also, fuel efficiency related to warm-up control may be improved because the fuel injection quantity Qf is increased gradually in accordance with the catalyst temperature Tc.

Furthermore, in the warm-up control in this embodiment, the opening amount of the EGR valve 32 (hereinafter simply referred to as "EGR opening amount") Degr is changed from the opening amount for normal control (hereinafter referred to as "normal control opening amount") Degrn to an opening amount for warm-up control (hereinafter referred to as "target opening amount Degrh"). The normal control opening amount Degrn is the EGR opening amount Degr appropriate for the operating state of the engine 1. The normal control opening amount Degrn may be empirically determined and stored in a map or calculated based on the engine torque TQe and the engine speed using function stored in the map.

On the other hand, the target opening amount Degrh is the EGR opening amount Degr that is maintained when warm-up control is executed. The target opening amount Degrh is wider (i.e., larger) than the normal control opening amount Degrn. Executing the control to increase the EGR opening amount Degr when the warm-up control is executed increases the amount of EGR gas that is recirculated to the engine 1. As a result, the temperature of the exhaust gas discharged from the engine 1 increases so the oxidation catalyst 20a may be warmed up more rapidly.

Figure 6:
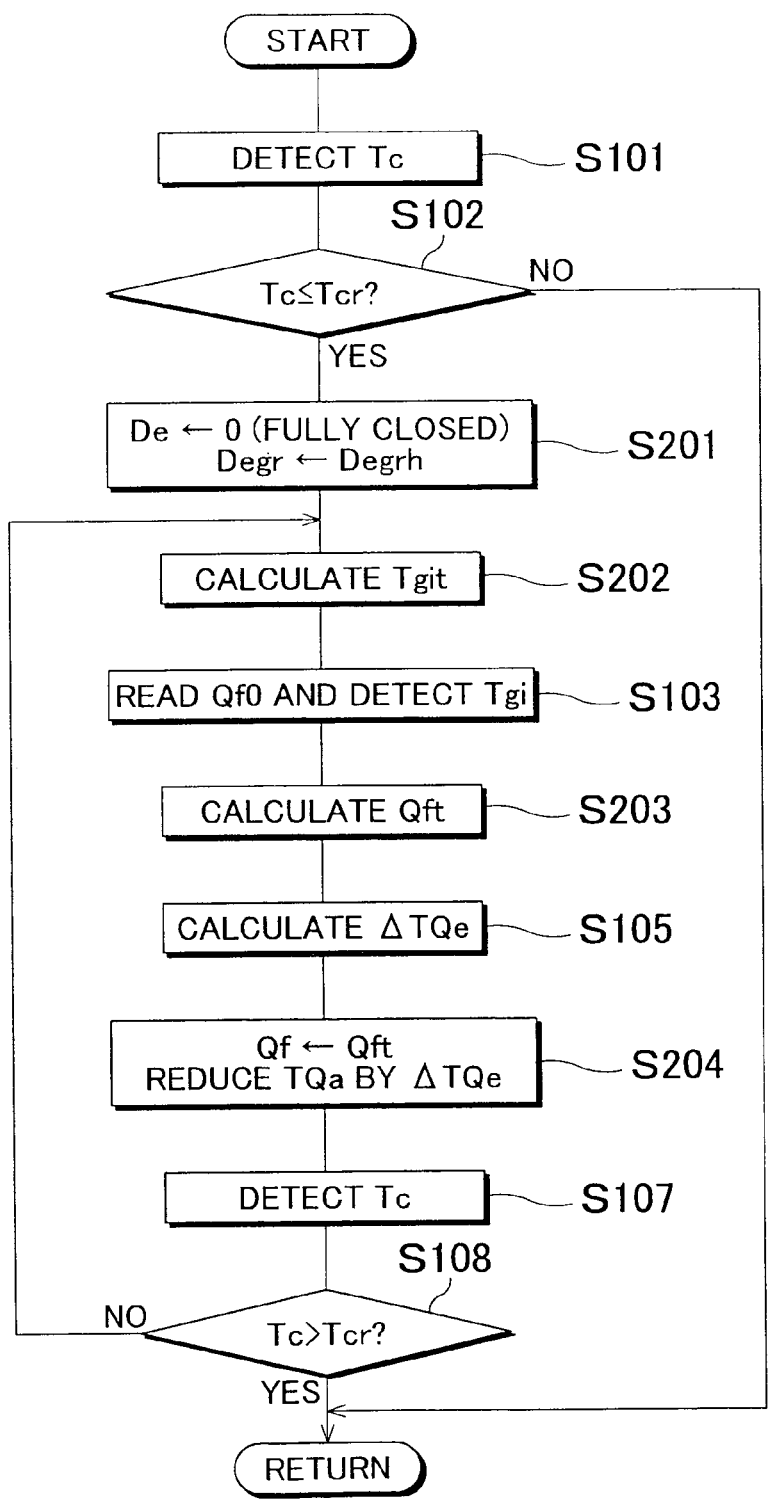
FIG. 6 is a flowchart illustrating a warm-up control process according to a second example embodiment of the invention.

Hereinafter, warm-up control executed by the main ECU 3 will be described with reference to the flowchart in FIG. 6 which illustrates a warm-up control process of the second embodiment. This process is a program that is stored in the ROM of the main ECU 3 and is executed at predetermined intervals. Steps in this process that are the same as steps in the warm-up control process according to the first embodiment will be referred to using the same step numbers and detailed descriptions of those steps will be omitted.

In step S201 of this process, the opening amount De of the exhaust throttle valve 23 is changed to zero (i.e., fully closed). As a result, the pressure inside the exhaust passage 29, upstream of the exhaust throttle valve 23, increases. Accordingly, the inflow-exhaust gas temperature Tgi increases and the flow-through exhaust gas flowrate Ve suddenly decreases.

Also in this step, the EGR opening amount Degr is changed from the normal control opening amount Degrn to the target opening amount Degrh. The target opening amount Degrh may be obtained in advance as a map or function set according to the engine torque TQe and the engine speed, for example, or the current normal control opening amount Degrn may be read and the target opening amount Degrh may be calculated to be a wider (i.e., larger) opening amount than that value. The main ECU that executes step S201 of this process serves as a third catalyst warm-up device of the invention.

In step S202, the target inflow-exhaust gas temperature Tgit is calculated. More specifically, the target inflow-exhaust gas temperature Tgit is calculated by adding the reference temperature difference ΔTb to the catalyst temperature Tc detected by the second temperature sensor 25. Next in step S103, the current fuel injection quantity Qf0 is read from a control signal to the fuel injection valve 13 of the engine 1, and the current inflow-exhaust gas temperature Tgi is detected from the output value of the first temperature sensor 24.

In step S203, the target injection quantity Qft is calculated based on the current fuel injection quantity W0, the current inflow-exhaust gas temperature Tgi, and the target inflow-exhaust gas temperature Tgit set in step S202. That is, the target injection quantity Qft needed to raise the current inflow-exhaust gas temperature Tgi to the target inflow-exhaust gas temperature Tgit is calculated.

Next, in step S105, the engine torque increase amount ΔTQe is calculated, and then in step S204, the fuel injection quantity Qf is increased from the current fuel injection quantity QM to the target injection quantity Qft. Also, the assist torque TQa is reduced by that engine torque increase amount ΔTQe. Then this step ends and the process proceeds on to step S107. Here, the delay before the catalyst temperature Tc rises in response to the increase in the fuel injection quantity Qf may be determined empirically and the process may proceed on to step S107 after the delay period has elapsed.

In step S107, the catalyst temperature Tc is detected again, and then in step S108, it is determined whether the catalyst temperature Tc is higher than the warm-up threshold temperature Tcr. If it is determined that the catalyst temperature Tc is higher than the warm-up threshold temperature Tcr, this cycle of the process ends.

If, on the other hand, it is determined that the catalyst temperature Tc is equal to or less than the warm-up threshold temperature Tcr, the process returns to step S202. That is, the target inflow-exhaust gas temperature Tgit is calculated by adding the reference temperature difference ΔTb to the catalyst temperature Tc detected in step S107. Then the steps thereafter are executed and steps S202 to S108 are repeated until it is determined in step S108 that the catalyst temperature Tc is higher than the warm-up threshold temperature Tc.

According to this process, the fuel injection quantity Qf is gradually increased in accordance with the catalyst temperature Tc when warm-up control is executed so that fuel efficiency related to the warm-up control of the oxidation catalyst 20a is improved. Also, the fuel injection quantity Qf is not suddenly increased even if the catalyst temperature Tc is excessively low so exhaust gas emissions may be further improved. Also, increasing the amount of EGR gas enables the catalyst temperature Tc to be quickly raised to the warm-up threshold temperature Tcr so the oxidation catalyst 20a may be activated even earlier.

Also, the EGR passage 31 in this embodiment is connected to the intake passage 19 and a portion of the exhaust passage 29 downstream of the exhaust throttle valve 23. As a result, the pressure within the EGR passage 31 will not rise excessively even if the exhaust throttle control of this embodiment is executed. Accordingly, the metering precision of the EGR gas amount, when the EGR valve 32 is controlled to decrease its opening amount, is improved.

Further, in the second embodiment, the first intake throttle valve 21 and the second intake throttle valve 22 may be controlled so that their opening amounts increase when the EGR opening amount Degr is increased. As a result, the pressure inside the exhaust passage 29 upstream of the exhaust throttle valve 23 may be further increased so the temperature of the oxidation catalyst 20a is more efficiently raised.

Further, the exhaust gas control system in this embodiment may also include, in addition to the EGR apparatus 30, a high pressure EGR apparatus that recirculates some of the exhaust gas that passes through the exhaust manifold 28 to the intake manifold 18. In this case, the amount of EGR gas recirculated to the engine 1 by the high pressure EGR apparatus refers to the amount of high pressure EGR gas, and the amount of EGR gas recirculated to the engine 1 by the EGR apparatus 30 refers to the amount of low pressure EGR gas.

Because the high pressure EGR apparatus recirculates some of the exhaust gas before it passes through the oxidation catalyst 20a to the engine 1, if the amount of high pressure EGR gas is excessive when the warm-up control is executed, the amount of heat supplied to the oxidation catalyst 20a may be less or the pressure inside the exhaust passage 29 upstream of the exhaust throttle valve 23 may be lower. Therefore, when the warm-up control is executed in an exhaust gas control system having this structure, the amount of low pressure EGR gas may be increased and the amount of high pressure EGR gas may be reduced, which enables warm-up control for the oxidation catalyst 20a to be better executed.

The invention claimed is:

1. An internal combustion engine exhaust gas control system, which is applied to a hybrid vehicle that is powered by an internal combustion engine and an electric motor, the internal combustion engine exhaust gas control system comprising:
an exhaust gas control catalyst provided in an exhaust passage of the internal combustion engine;
an exhaust throttle valve, provided downstream of the exhaust gas control catalyst, that changes a sectional area of the exhaust passage;
an electronic control unit;
a memory, the memory storing instructions that when executed cause the electronic control unit to perform as:
a first catalyst warm-up device that warms up the exhaust gas control catalyst by increasing a fuel injection quantity in the internal combustion engine;
an assist amount adjusting device that adjusts assist torque generated by the electric motor such that the sum of engine torque, after the fuel injection quantity has been increased, and the assist torque is substantially equal to a required torque; and
a second catalyst warm-up device that warms up the exhaust gas control catalyst by decreasing an opening amount of the exhaust throttle valve,
wherein:
the first catalyst warm-up device increases the fuel injection quantity to increase a temperature of exhaust gas flowing into the exhaust gas control catalyst to a target exhaust gas temperature when the opening amount of the exhaust throttle valve is reduced to a target opening amount,
the target exhaust gas temperature is calculated by adding a reference temperature difference to a detected exhaust gas control catalyst temperature, and
an increase amount of the fuel injection quantity is reduced as the target opening amount of the exhaust throttle valve is reduced.

2. The internal combustion engine exhaust gas control system according to claim 1, wherein the target exhaust gas temperature is set higher than an activation temperature of the exhaust gas control catalyst but no higher than a threshold emissions temperature, at which an amount of pollutants discharged from the internal combustion engine exceeds a predetermined amount.

3. The internal combustion engine exhaust gas control system according to claim 1, further comprising:
a catalyst temperature sensor that detects a temperature of the exhaust gas control catalyst,
wherein the target exhaust gas temperature is set higher than the detected exhaust gas control catalyst temperature.

4. The internal combustion engine exhaust gas control system according to claim 3, wherein the target exhaust gas temperature is set so that a temperature difference between the detected exhaust gas control catalyst temperature and the target exhaust gas temperature does not exceed a maximum temperature difference.

5. The internal combustion engine exhaust gas control system according to claim 4, wherein the maximum temperature difference is the difference between the detected exhaust gas control catalyst temperature and an inflow-exhaust gas temperature when an increase amount of pollutants in the exhaust gas is equal to or less than a predetermined maximum value.

6. The internal combustion engine exhaust gas control system according to claim 4, wherein the maximum temperature difference is changed in accordance with the catalyst temperature.

7. The internal combustion engine exhaust gas control system according to claim 1, wherein the target opening amount of the exhaust throttle valve is substantially fully closed.

8. The internal combustion engine exhaust gas control system according to claim 1, wherein the assist amount adjusting device causes the electric motor to function as a generator if the engine torque, after the fuel injection quantity has been increased, exceeds the required torque.

9. The internal combustion engine exhaust gas control system according to claim 1, further comprising:
an EGR apparatus that:
i) includes an EGR passage that connects the exhaust passage downstream of the exhaust gas control catalyst with an intake passage of the internal combustion engine, and an EGR valve which is provided in the EGR passage and changes a sectional area of the EGR passage, and
ii) recirculates some of the exhaust gas that has passed through the exhaust gas control catalyst to the internal combustion engine via the EGR passage; and
wherein the instructions that when executed cause the electronic control unit to perform as a third catalyst warm-up device that warms up the exhaust gas control catalyst by controlling the EGR valve to increase an opening amount of the EGR valve.

10. The internal combustion engine exhaust gas control system according to claim 9, wherein the EGR passage connects the exhaust passage downstream of the exhaust throttle valve with the intake passage.

11. The internal combustion engine exhaust gas control system according to claim 9, further comprising:
an intake throttle valve, provided in the intake passage of the internal combustion engine, that adjusts an intake air amount,
wherein the third catalyst warm-up device controls the intake throttle valve to increase an opening amount of the intake throttle valve when the EGR valve is controlled to increase the opening amount of the EGR valve.

12. The internal combustion engine exhaust gas control system according to claim 3, wherein the target exhaust gas temperature is raised incrementally in accordance with the detected exhaust gas control catalyst temperature.

13. The internal combustion engine exhaust gas control system according to claim 12, wherein a target injection quantity is raised incrementally in accordance with the incremental raise in the target exhaust gas temperature.

14. The internal combustion engine exhaust gas control system according to claim 1, further comprising a particulate filter, the particulate filter located downstream of the exhaust gas control catalyst.

15. A control method of an internal combustion engine exhaust gas control system, which is applied to a hybrid vehicle that is powered by an internal combustion engine and an electric motor, comprising:
decreasing an opening amount of an exhaust throttle valve, provided downstream of an exhaust gas control catalyst, to a target opening amount if it is determined that warm-up control of the internal combustion engine is to be executed;

calculating a target exhaust gas temperature by adding a reference temperature difference to a detected exhaust gas control catalyst temperature;
calculating a target injection quantity of fuel necessary to raise the temperature of exhaust gas flowing into the exhaust gas control catalyst to the target exhaust gas temperature when the opening amount of the exhaust throttle valve has been decreased to the target opening amount;
setting the fuel injection quantity to the target injection quantity;
adjusting assist torque generated by the electric motor so that the sum of torque generated by the internal combustion engine and the assist torque generated by the electric motor substantially equals a required torque; and
reducing an increase amount of the fuel injection quantity as the target opening amount of the exhaust throttle valve is reduced.

16. The control method according to claim 15, wherein the internal combustion engine exhaust gas control system is provided with an EGR apparatus that:
   i) includes an EGR passage that connects an exhaust passage downstream of the exhaust gas control catalyst with an intake passage of the internal combustion engine, and an EGR valve which is provided in the EGR passage and changes a sectional area of the EGR passage, and
   ii) recirculates some of the exhaust gas that has passed through the exhaust gas control catalyst to the internal combustion engine via the EGR passage, the control method further comprising:
      decreasing the opening amount of the exhaust throttle valve to the target opening amount; and
      increasing an opening amount of the EGR valve to a predetermined opening amount if it is determined that the warm-up control of the internal combustion engine is to be executed.

17. The control method according to claim 15, wherein it is determined that the warm-up control of the internal combustion engine is to be executed when a temperature of the exhaust gas control catalyst is equal to or below a predetermined temperature.

18. The control method according to claim 17, wherein the predetermined temperature equals the sum of an activation temperature of the exhaust gas control catalyst and a predetermined margin, and is a temperature at or below which the exhaust gas control catalyst removes pollutants from the exhaust gas less efficiently than it does above that temperature.

19. The control method according to claim 15, further comprising:
   setting the target exhaust gas temperature to a temperature above an activation temperature of the exhaust gas control catalyst but no higher than a threshold emissions temperature at which an amount of pollutants discharged from the internal combustion engine is a predetermined amount, when it is determined that the warm-up control of the internal combustion engine is to be executed.

20. The control method according to claim 15, further comprising:
   setting the target exhaust gas temperature to a temperature above the temperature of the exhaust gas control catalyst when it is determined that the warm-up control of the internal combustion engine is to be executed.

21. The control method according to claim 15, further comprising:
   setting the target exhaust gas temperature to a temperature so that difference between the target exhaust gas temperature and the exhaust gas control catalyst temperature does not exceed a maximum temperature difference value when it is determined that the warm-up control of the internal combustion engine is to be executed.

22. The control method according to claim 15, wherein the target exhaust gas temperature is raised incrementally in accordance with the detected exhaust gas control catalyst temperature.

23. The control method according to claim 22, wherein the target injection quantity is raised incrementally in accordance with the incremental raise in the target exhaust gas temperature.

24. An internal combustion engine exhaust gas control system, which is applied to a hybrid vehicle that is powered by an internal combustion engine and an electric motor, the internal combustion engine exhaust gas control system comprising:
   an exhaust gas control catalyst provided in an exhaust passage of the internal combustion engine;
   an exhaust throttle valve, provided downstream of the exhaust gas control catalyst, that changes a sectional area of the exhaust passage;
   an electronic control unit;
   a memory, the memory storing instructions that when executed cause the electronic control unit to perform as:
      a first catalyst warm-up device that warms up the exhaust gas control catalyst by increasing a fuel injection quantity in the internal combustion engine;
      an assist amount adjusting device that adjusts assist torque generated by the electric motor such that the sum of engine torque, after the fuel injection quantity has been increased, and the assist torque is substantially equal to a required torque; and
      a second catalyst warm-up device that warms up the exhaust gas control catalyst by decreasing an opening amount of the exhaust throttle valve; and
   a catalyst temperature sensor that detects the temperature of the exhaust gas control catalyst,
   wherein:
   when the opening amount of the exhaust throttle valve is reduced to a target opening amount, the first catalyst warm-up device increases the fuel injection quantity to increase a temperature of exhaust gas flowing into the exhaust gas control catalyst to a target exhaust gas temperature such that the target exhaust gas temperature is increased gradually and the fuel injection quantity is increased gradually in accordance with an increase in the temperature of the exhaust gas control catalyst, the target exhaust gas temperature being set higher than the detected exhaust gas control catalyst temperature, and
   an increase amount of the fuel injection quantity is reduced as the target opening amount of the exhaust throttle valve is reduced.

* * * * *